United States Patent
Abdelmalek et al.

(10) Patent No.: US 12,016,075 B2
(45) Date of Patent: Jun. 18, 2024

(54) SYSTEMS AND METHODS FOR TRANSFERRING MULTIPLE PACKET DATA UNIT SESSIONS WITH A SAME DATA NETWORK NAME CONFIGURATION BETWEEN NETWORKS

(71) Applicant: Verizon Patent and Licensing Inc., Basking Ridge, NJ (US)

(72) Inventors: Yousef Abdelmalek, New Providence, NJ (US); Sudhakar Reddy Patil, Flower Mound, TX (US); Violeta Cakulev, Milburn, NJ (US); Joseph Lee, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 362 days.

(21) Appl. No.: 17/567,390

(22) Filed: Jan. 3, 2022

(65) Prior Publication Data

US 2023/0217542 A1 Jul. 6, 2023

(51) Int. Cl.
*H04W 76/36* (2018.01)
*H04W 36/06* (2009.01)
*H04W 76/20* (2018.01)
*H04W 80/02* (2009.01)

(52) U.S. Cl.
CPC .......... *H04W 76/36* (2018.02); *H04W 36/06* (2013.01); *H04W 76/20* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 11,032,710 B2 * | 6/2021 | Faccin | .................. | H04W 12/06 |
| 11,160,049 B2 * | 10/2021 | Li | .......................... | H04W 4/029 |
| 11,202,338 B2 * | 12/2021 | Xiong | .................. | H04M 15/62 |

* cited by examiner

*Primary Examiner* — Hong S Cho

(57) ABSTRACT

A network device may receive an indication of movement of a user device, associated with multiple packet data unit (PDU) sessions, from a first radio access network (RAN) to a second RAN, and may maintain, based on the indication, a particular PDU session, of the multiple PDU sessions, associated with a default flow. The network device may release, based on the indication, the multiple PDU sessions other than the particular PDU session, and may handle the multiple PDU sessions, other than the particular PDU session, in accordance with a handling option.

20 Claims, 11 Drawing Sheets

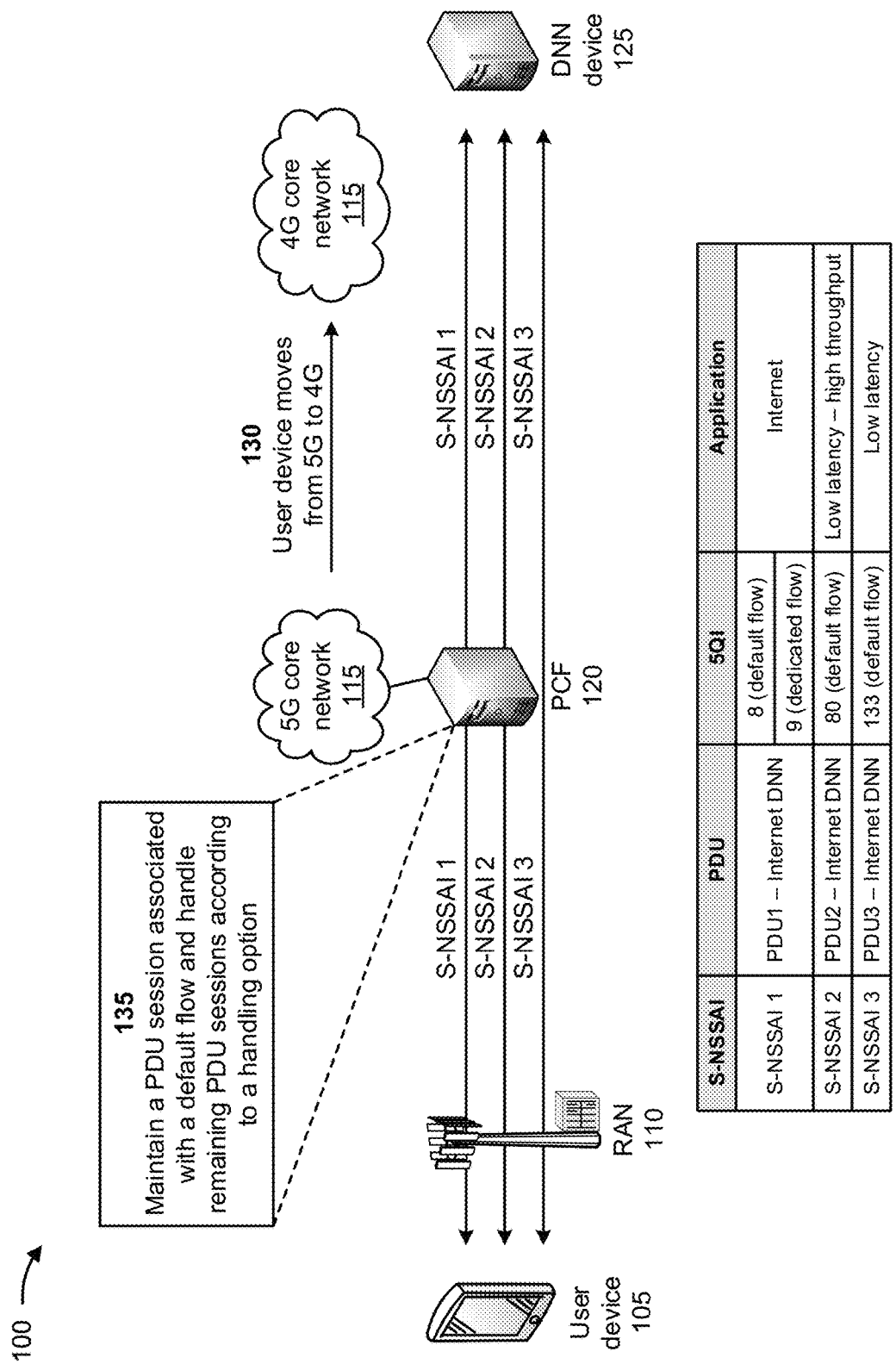

SYSTEMS AND METHODS FOR TRANSFERRING MULTIPLE PACKET DATA UNIT SESSIONS WITH A SAME DATA NETWORK NAME CONFIGURATION BETWEEN NETWORKS

BACKGROUND

A radio access network (RAN) (e.g., a fourth generation (4G) RAN or a fifth generation (5G) network RAN) is part of a mobile telecommunication system that implements a radio access technology.

BRIEF DESCRIPTION OF THE DRAWINGS

FIGS. 1A-1G are diagrams of an example associated with transferring multiple packet data unit (PDU) sessions with a same data network name (DNN) configuration between 4G and 5G networks.

DETAILED DESCRIPTION OF EXAMPLE EMBODIMENTS

Figure 1B:
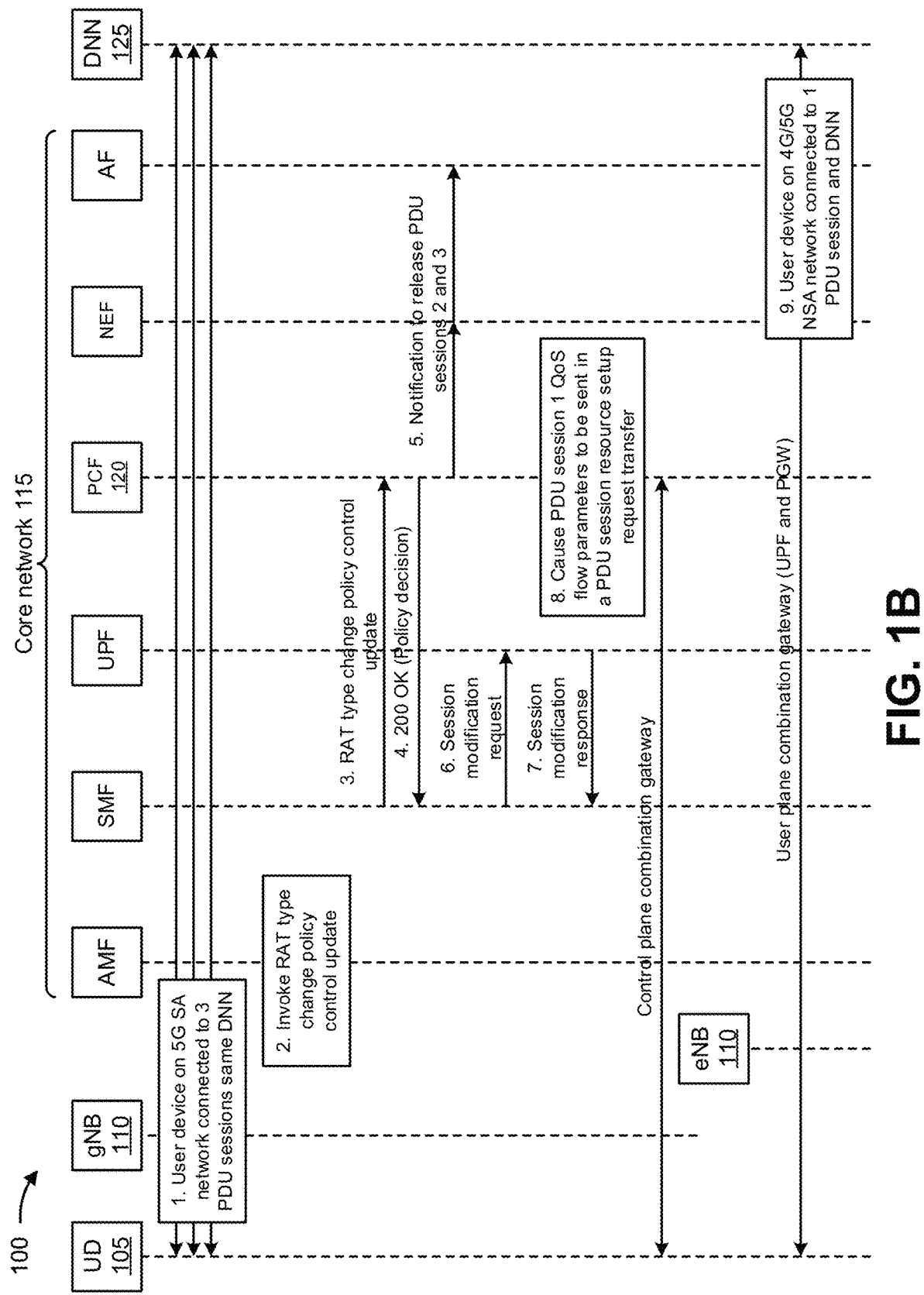

The following detailed description of example implementations refers to the accompanying drawings. The same reference numbers in different drawings may identify the same or similar elements.

Current network configurations fail to enable transfer of multiple PDU sessions (e.g., quality of service (QoS) flows) with a same DNN configuration (e.g., a same DNN name), across multiple slices for a same user device, from one advanced network to another e.g., a 5G standalone access (SA) network to a 4G network and vice versa. A 4G network is unable to identify 5G slices associated with the PDU sessions. Multiple PDU sessions with the same DNN configuration may not be well-defined nor implemented by the 4G network due to lack of standard procedures in 3GPP and challenges associated with network and user device implementation. For example, a user device may utilize a 5G SA network (e.g., a 5G New Radio (NR) network and a 5G core network) with the following slicing and PDU session configuration: a first single network slice selection assistance information (S-NSSAI) 1 associated with an Internet DNN and a default flow (e.g., an enhanced mobile broadband (eMBB) slice); a second S-NSSAI 2 associated with the Internet DNN and a default flow (e.g., a low latency (LL) slice); and a third S-NSSAI 3 associated with the Internet DNN and a default flow (e.g., a high throughput slice). The user device may be moving away from the 5G SA network and toward a 4G base station (e.g., an eNodeB). However, the 4G network may be unable to determine which PDU session will persist in the 4G network, which PDU sessions will be released, what will happen to the dedicated and/or default bearers associated with the released PDU sessions, and/or the like.

In another example, a user device may utilize a 4G/5G non-standalone access (NSA) (e.g., 4G access and 5G core) with the following PDU session configuration: an Internet DNN with a default flow (e.g., an eMBB slice), a dedicated flow associated with a first QoS class identifier (QCI) (e.g., QCI-80 for a low latency application), and a dedicated flow associated with a second QCI (e.g., QCI-70 for a high throughput application). The user device may be moving away from the 4G/5G NSA network and toward a 5G base station (e.g., a gNodeB). However, the 5G network may be unable to determine what will happen to the dedicated flows on the Internet DNN, what will happen in terms of slices, how the user device will learn about new QoS rules, and/or the like.

Thus, current network configurations consume computing resources (e.g., processing resources, memory resources, communication resources, and/or the like), networking resources, and/or other resources associated with failing to transfer multiple PDU sessions with a same DNN configuration between a 5G SA network and a 4G network, maintaining a correct PDU session during the transfer of the multiple PDU sessions, handling released PDU sessions during the transfer of the multiple PDU sessions, associating bearers/flows to appropriate slices, and/or the like.

Some implementations described herein provide a network device (e.g., a policy control function (PCF)) that defines behavior for transferring multiple PDU sessions with a same DNN configuration between 4G and 5G networks. For example, the PCF may receive an indication of movement of a user device, associated with multiple PDU sessions, from a first RAN to a second RAN, and may maintain, based on the indication, a particular PDU session, of the multiple PDU sessions, associated with a default flow. The PCF may release, based on the indication, the multiple PDU sessions other than the particular PDU session, and may handle the multiple PDU sessions, other than the particular PDU session, in accordance with a handling option.

In this way, the PCF may define behavior for transferring multiple PDU sessions with a same DNN configuration between 4G and 5G networks. For example, when a user device, associated with multiple PDU sessions, moves from a 5G network to a 4G network, the PCF may maintain one of the PDU sessions (e.g., a PDU session associated with a default flow) and may treat the remaining PDU sessions according to an option associated with releasing the remaining PDU sessions. When the user device moves from the 4G network to the 5G network, the PCF may maintain one of the PDU sessions (e.g., a PDU session associated with a default bearer) and may create slices for the remaining PDU sessions, which may enhance a subscriber experience. Thus, the PCF may conserve computing resources, networking resources, and/or other resources associated with failing to transfer multiple PDU sessions with a same DNN configuration between a 5G SA network and a 4G network, maintaining a correct PDU session during the transfer of the multiple PDU sessions, handling released PDU sessions during the transfer of the multiple PDU sessions, and/or the like.

FIGS. 1A-1G are diagrams of an example 100 associated with transferring multiple PDU sessions with a same DNN configuration between 4G and 5G networks. As shown in FIGS. 1A-1G, example 100 includes a user device 105, a RAN 110, a core network 115 (e.g., a 4G core network 115 and a 5G core network 115), a PCF 120, and a DNN device 125. Further details of the user device 105, the RAN 110, the core network 115, the PCF 120, and the DNN device 125 are provided elsewhere herein.

As shown in FIG. 1A, the user device 105 may be utilizing multiple PDU sessions with a same DNN configuration (e.g., a same DNN name provided via the DNN device 125), across multiple slices of the RAN 110 and the 5G core network 115 (e.g., a 5G SA network). For example, the user device 105 may utilize a 5G SA network (e.g., the RAN 110 and the 5G core network 115) with the following slicing and PDU session configuration: a first network slice (e.g., S-NSSAI 1) associated with an Internet DNN, a default flow (e.g., with a quality index (5QI) of 8), a dedicated flow (e.g., with an 5QI of 9), and an Internet application (e.g., an eMBB application); a second network slice (e.g., S-NSSAI 2) associated with the Internet DNN, a default flow (e.g., with an 5QI of 80), and a low latency, high throughput application; and a third network slice (e.g., S-NSSAI 3) associated with the Internet DNN, a default flow (e.g., with an 5QI of 133), and a low latency application.

As further shown in FIG. 1A, and by reference number 130, the user device 105 may move from the 5G core network 115 to the 4G core network 115. For example, the user device 105 may be moving away from the RAN 110 (e.g., a gNodeB) associated with 5G core network 115 and toward a RAN 110 (e.g., an eNodeB) associated with the 4G core network 115. When the user device 105 moves from the 5G core network 115 to the 4G core network 115, the PCF 120 may receive an indication that the user device 105 is moving from the 5G core network 115 to the 4G core network 115.

In some implementations, when the PCF 120 receives an indication of the user device 105 moving between the 5G core network 115 and the 4G core network 115, the PCF 120 may determine whether the user device 105 is a 5G subscriber of the 5G core network 115. If the PCF 120 determines that the user device 105 is not a 5G subscriber of the 5G core network 115, the PCF 120 may not perform further processing for the user device 105. If the PCF 120 determines that the user device 105 is a 5G subscriber of the 5G core network 115, the PCF 120 may determine whether the user device 105 is utilizing multiple PDU sessions with the same DNN configuration. If the PCF 120 determines that the user device 105 is not utilizing multiple PDU sessions with the same DNN configuration, the PCF 120 may not perform further processing for the user device 105. If the PCF 120 determines that the user device 105 is utilizing multiple PDU sessions with the same DNN configuration, the PCF 120 may determine whether the user device 105 is currently being served by the 5G core network 115 or the 4G core network 115.

If the PCF 120 determines that the user device 105 is currently being served by the 5G core network 115, the PCF 120 may perform an interworking handover of the user device 105 from the 5G core network 115 to the 4G core network 115 and may handle the multiple PDU sessions as further described below in connection with FIGS. 1A-1D. If the PCF 120 determines that the user device 105 is currently being served by the 4G core network 115, the PCF 120 may perform an interworking handover of the user device 105 from the 4G core network 115 to the 5G core network 115 and may handle the multiple PDU sessions as further described below in connection with FIGS. 1E-1G.

As further shown in FIG. 1A, and by reference number 135, the PCF 120 may maintain a PDU session associated with a default flow and may handle remaining PDU sessions according to a handling option. For example, the PCF 120 may maintain one of the multiple PDU sessions when the user device 105 moves from the 5G core network 115 to the 4G core network 115. In some implementations, the PCF 120 may maintain the PDU session associated with a default flow (e.g., an eMMB slice or a default slice), such as the first network slice (e.g., S-NSSAI 1) associated with the Internet application. The PCF 120 may handle the remaining PDU sessions (e.g., the second network slice S-NSSAI 2 and the third network slice S-NSSAI 3) according to a handling option.

FIG. 1B is a call flow diagram depicting steps associated with handling the remaining PDU sessions according to a first handling option. As shown in step 1, the user device 105 may be on a 5G SA network (e.g., the 5G core network 115) and connected to three PDU sessions with the same DNN configuration (e.g., the first network slice S-NSSAI 1, the second network slice S-NSSAI 2, and the third network slice S-NSSAI 3). As shown at step 2, when the user device 105 begins moving from the 5G core network 115 to the 4G core network 115, an access and mobility management function (AMF) of the 5G core network 115 may generate a radio access technology (RAT) type change policy control update (e.g., indicating that the user device 105 is moving from the 5G core network 115 to the 4G core network 115). As shown at step 3, a session management function (SMF) of the 5G core network 115 may provide the RAT type change policy control update to the PCF 120 so that the PCF 120 is aware that the user device 105 is moving from the 5G core network 115 to the 4G core network 115. As shown at step 4, the PCF 120 may acknowledge receipt of the RAT type change policy control update to the AMF via an acknowledgment message (e.g., a 200 OK policy decision message).

As shown at step 5 in FIG. 1B, the PCF 120 may provide, to an application function (AF) and via a network exposure function (NEF) of the 5G core network 115, a notification instructing the AF to release the second and third PDU sessions (e.g., the second network slice S-NSSAI 2 and the third network slice S-NSSAI 3). As shown at step 6, the SMF of the 5G core network 115 may provide a session modification request (e.g., indicating that the second and third PDU sessions are to be released) to a user plane function (UPF) of the 5G core network 115. As shown at step 7, the UPF may release the second and third PDU sessions based on the session modification request, and may provide, to the SMF, a session modification response indicating that the second and third PDU sessions have been released. A service interruption (e.g., for the user device 105) may occur for applications utilizing the second and third PDU sessions.

As shown at step 8 in FIG. 1B, the PCF 120 may cause QoS flow parameters of the first PDU session to be sent to the user device 105 via a control plane combination gateway and a PDU session resource setup request transfer. As shown at step 9, the user device 105 may utilize a 4G RAN 110 (e.g., an eNodeB) and a user plane combination gateway (e.g., the UPF and a packet data network gateway (PGW) of the 4G core network 115) to connect to the 4G core network 115 (e.g., or a 5G NSA network) and utilize the first PDU session with the DNN device 125.

Figure 1C:
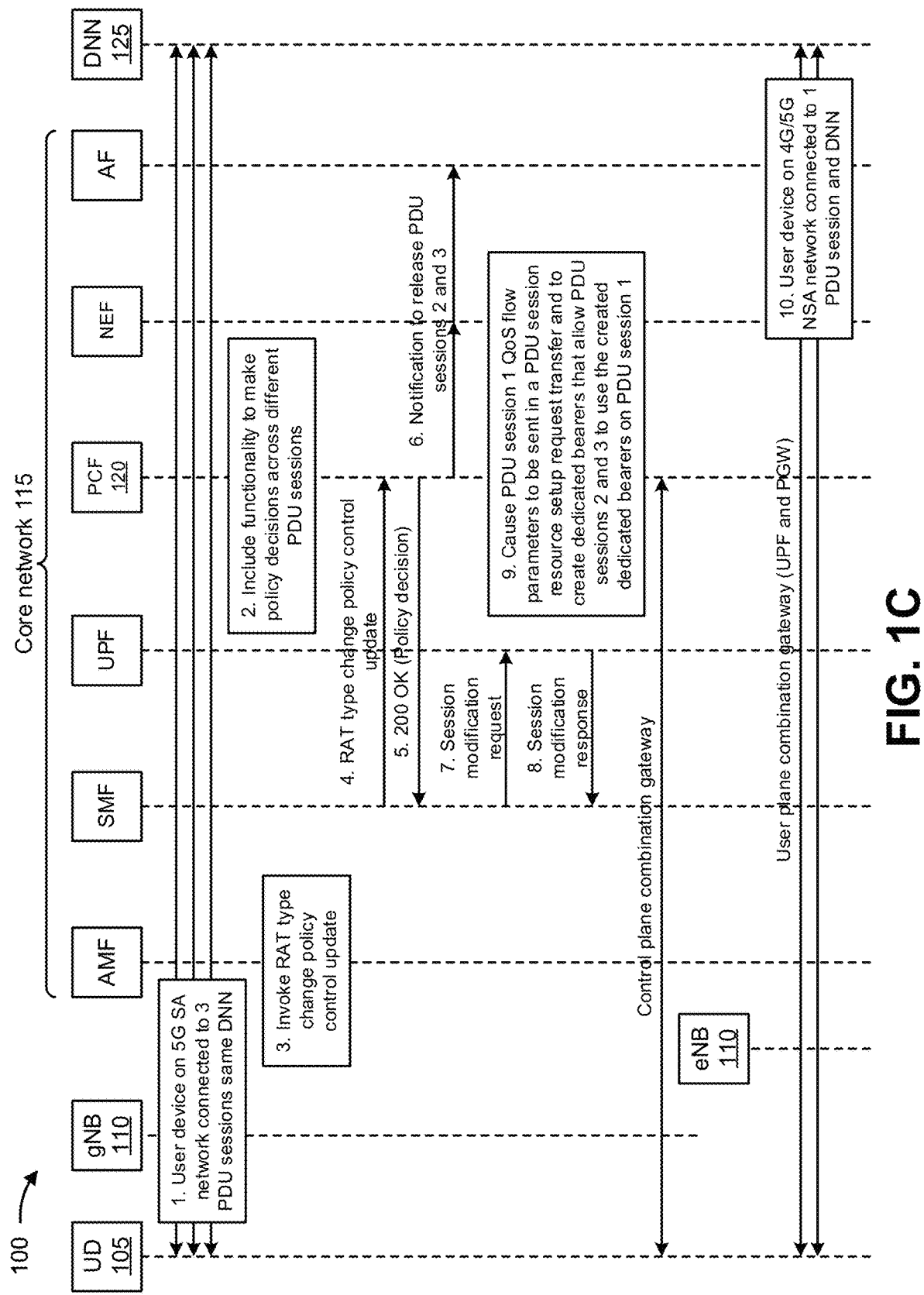

FIG. 1C is a call flow diagram depicting steps associated with handling the remaining PDU sessions according to a second handling option. As shown at step 1, the user device 105 may be on a 5G SA network (e.g., the 5G core network 115) and connected to three PDU sessions with the same DNN configuration (e.g., the first network slice S-NSSAI 1, the second network slice S-NSSAI 2, and the third network slice S-NSSAI 3). As shown at step 2, the PCF 120 may include functionality that enables the PCF 120 to make policy decisions across different PDU sessions. As shown at step 3, when the user device 105 begins moving from the 5G core network 115 to the 4G core network 115, the AMF of the 5G core network 115 may generate a RAT type change policy control update (e.g., indicating that the user device 105 is moving from the 5G core network 115 to the 4G core network 115). As shown at step 4, the SMF may provide the RAT type change policy control update to the PCF 120 so that the PCF 120 is aware that the user device 105 is moving from the 5G core network 115 to the 4G core network 115. As shown at step 5, the PCF 120 may acknowledge receipt of the RAT type change policy control update to the AMF via an acknowledgment message (e.g., a 200 OK policy decision message).

As shown at step 6 in FIG. 1C, the PCF 120 may provide, to the AF and via the NEF of the 5G core network 115, a notification instructing the AF to release the second and third PDU sessions (e.g., the second network slice S-NSSAI 2 and the third network slice S-NSSAI 3). As shown at step 7, the SMF of the 5G core network 115 may provide a session modification request (e.g., indicating that the second and third PDU sessions are to be released) to the UPF of the 5G core network 115. As shown at step 8, the UPF may release the second and third PDU sessions based on the session modification request, and may provide, to the SMF, a session modification response indicating that the second and third PDU sessions have been released.

As shown at step 9 in FIG. 1C, the PCF 120 may cause QoS flow parameters of the first PDU session to be sent to the user device 105 via a control plane combination gateway and a PDU session resource setup request transfer. The PCF 120 may also cause dedicated bearers to be created that enable applications using the second and third PDU sessions to utilize the created dedicated bearers on the first PDU session. A temporary service interruption (e.g., for the user device 105) may occur for applications utilizing the second and third PDU sessions until the dedicated bearers are established. As shown at step 10, the user device 105 may utilize a 4G RAN 110 (e.g., an eNodeB) and a user plane combination gateway (e.g., the UPF and the PGW of the 4G core network 115) to connect to the 4G core network 115 (e.g., or a 5G NSA network) and utilize the first PDU session with the DNN device 125.

Figure 1D:
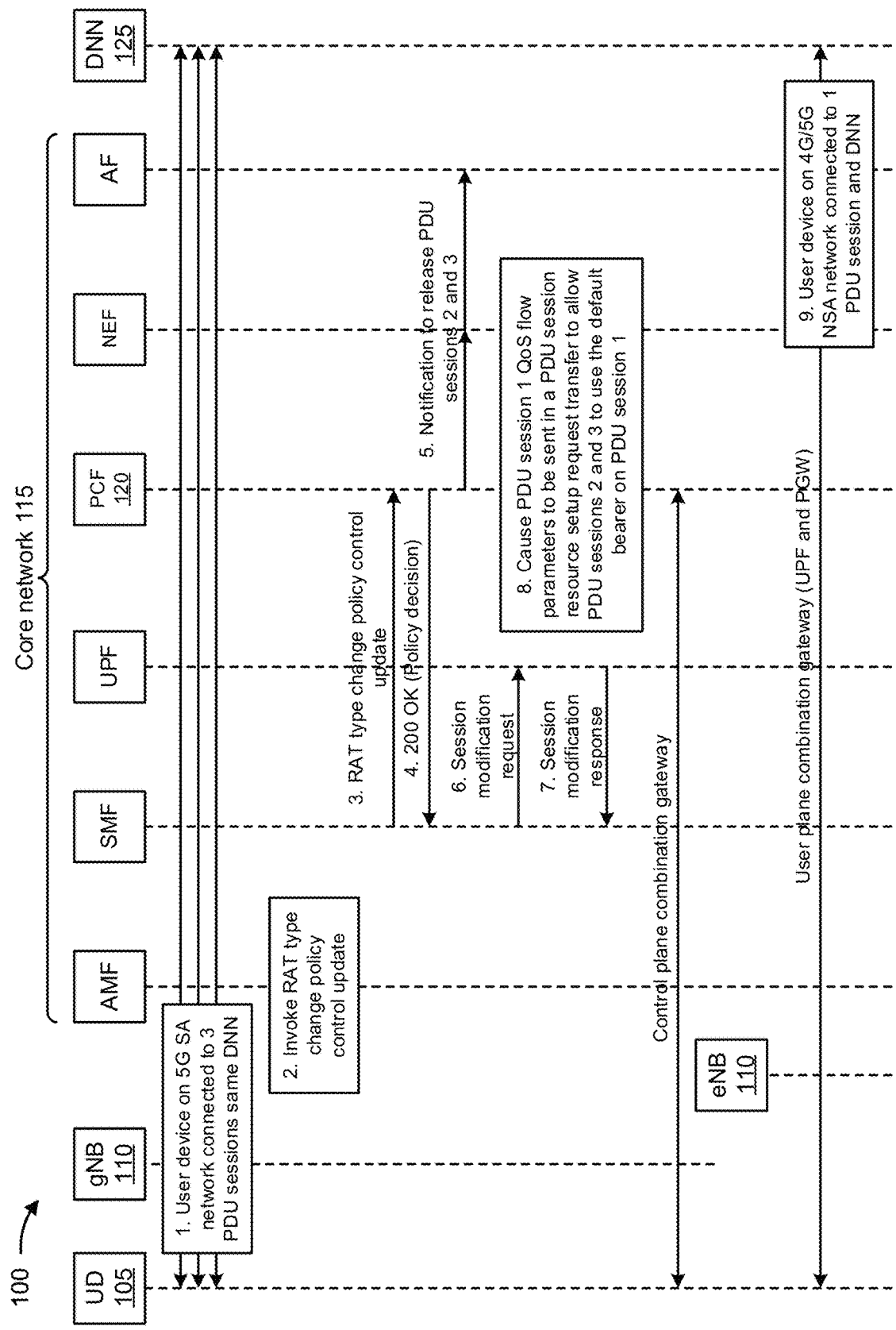

FIG. 1D is a call flow diagram depicting steps associated with handling the remaining PDU sessions according to a third handling option. As shown at step 1, the user device 105 may be on a 5G SA network (e.g., the 5G core network 115) and connected to three PDU sessions with the same DNN configuration (e.g., the first network slice S-NSSAI 1, the second network slice S-NSSAI 2, and the third network slice S-NSSAI 3). As shown at step 2, when the user device 105 begins moving from the 5G core network 115 to the 4G core network 115, the AMF of the 5G core network 115 may generate a RAT type change policy control update (e.g., indicating that the user device 105 is moving from the 5G core network 115 to the 4G core network 115). As shown at step 3, the SMF may provide the RAT type change policy control update to the PCF 120 so that the PCF 120 is aware that the user device 105 is moving from the 5G core network 115 to the 4G core network 115. As shown at step 4, the PCF 120 may acknowledge receipt of the RAT type change policy control update to the AMF via an acknowledgment message (e.g., a 200 OK policy decision message).

As shown at step 5 in FIG. 1D, the PCF 120 may provide, to the AF and via the NEF of the 5G core network 115, a notification instructing the AF to release the second and third PDU sessions (e.g., the second network slice S-NSSAI 2 and the third network slice S-NSSAI 3). As shown at step 6, the SMF of the 5G core network 115 may provide a session modification request (e.g., indicating that the second and third PDU sessions are to be released) to the UPF of the 5G core network 115. As shown at step 7, the UPF may release the second and third PDU sessions based on the session modification request, and may provide, to the SMF, a session modification response indicating that the second and third PDU sessions have been released.

As shown at step 8 in FIG. 1D, the PCF 120 may cause QoS flow parameters of the first PDU session to be sent to the user device 105 via a control plane combination gateway and a PDU session resource setup request transfer. The PCF 120 may also utilize the default bearer of the first PDU session to serve applications using the second and third PDU sessions. A temporary service interruption (e.g., for the user device 105) may occur for applications utilizing the second and third PDU sessions until the QoS flow parameters become effective for the applications. As shown at step 9, the user device 105 may utilize a 4G RAN 110 (e.g., an eNodeB) and a user plane combination gateway (e.g., the UPF and the PGW of the 4G core network 115) to connect to the 4G core network 115 (e.g., or a 5G NSA network) and utilize the first PDU session with the DNN device 125.

Figure 1E:
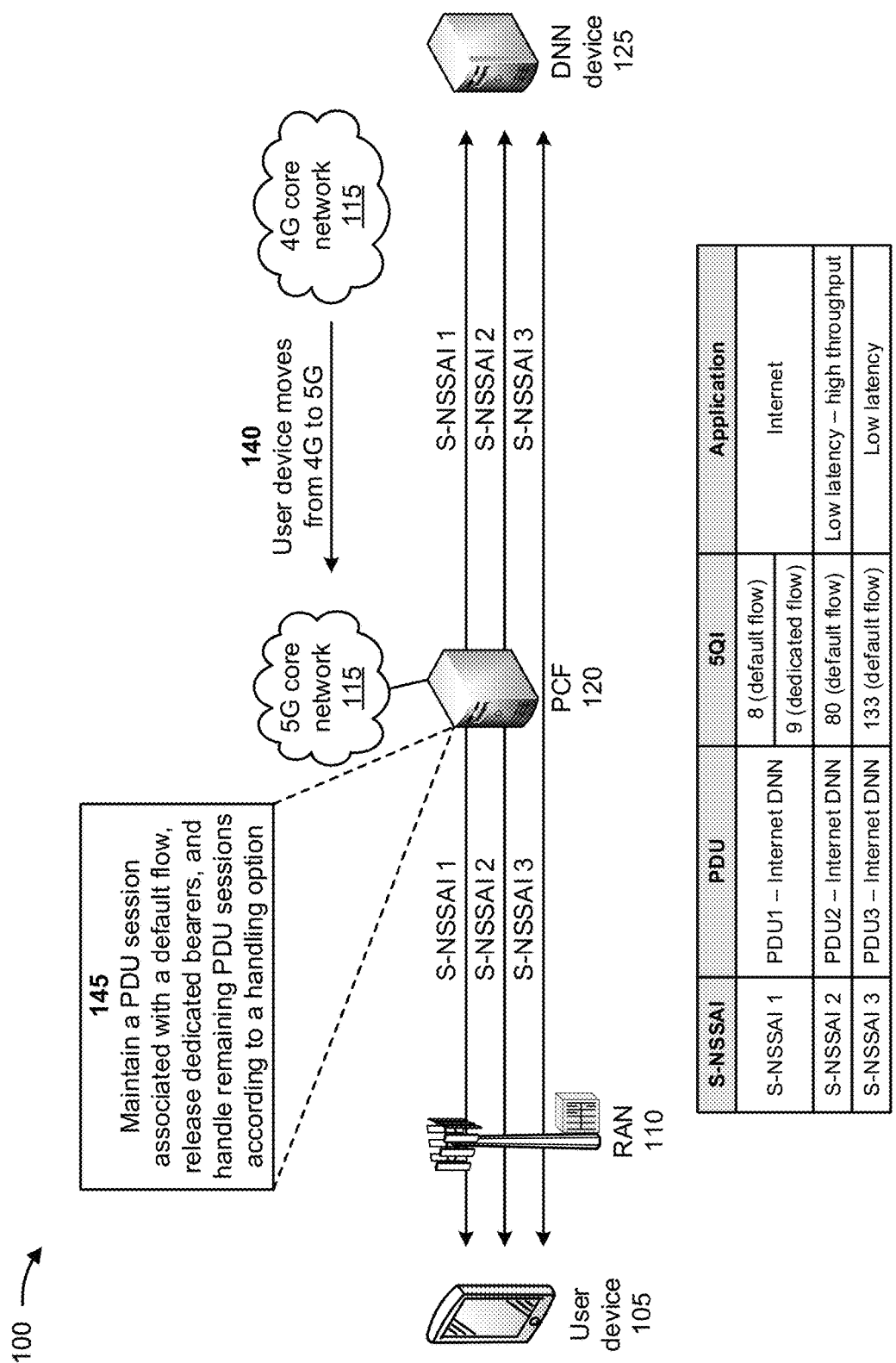

As shown in FIG. 1E, and by reference number 140, the user device 105 may move from the 4G core network 115 to the 5G core network 115. For example, the user device 105 may be moving away from the RAN 110 (e.g., an eNodeB) associated with 4G core network 115 and toward a RAN 110 (e.g., a gNodeB) associated with the 5G core network 115. When the user device 105 moves from the 4G core network 115 to the 5G core network 115, the PCF 120 may receive an indication that the user device 105 is moving from the 4G core network 115 to the 5G core network 115.

In some implementations, when the PCF 120 receives an indication of the user device 105 moving from the 4G core network 115 to the 5G core network 115, the PCF 120 may determine that the user device 105 is a 5G subscriber of the 5G core network 115, and may determine that the user device 105 is utilizing multiple PDU sessions with the same DNN configuration. The PCF 120 may determine that the user device 105 is currently being served by the 4G core network 115, and may perform an interworking handover of the user device 105 from the 4G core network 115 to the 5G core network 115.

As further shown in FIG. 1E, and by reference number 145, the PCF 120 may maintain a PDU session associated with a default flow and may handle remaining multiple dedicated bearers according to a handling option. For example, the PCF 120 may maintain one of the multiple PDU sessions when the user device 105 moves from the 4G core network 115 to the 5G core network 115. In some implementations, the PCF 120 may maintain the PDU session associated with a default flow (e.g., an eMMB slice or a default slice), such as the first network slice (e.g., S-NSSAI 1) associated with the Internet application. The PCF 120 may handle the remaining PDU sessions (e.g., the second network slice S-NSSAI 2 and the third network slice S-NSSAI 3) according to a handling option.

Figure 1F:
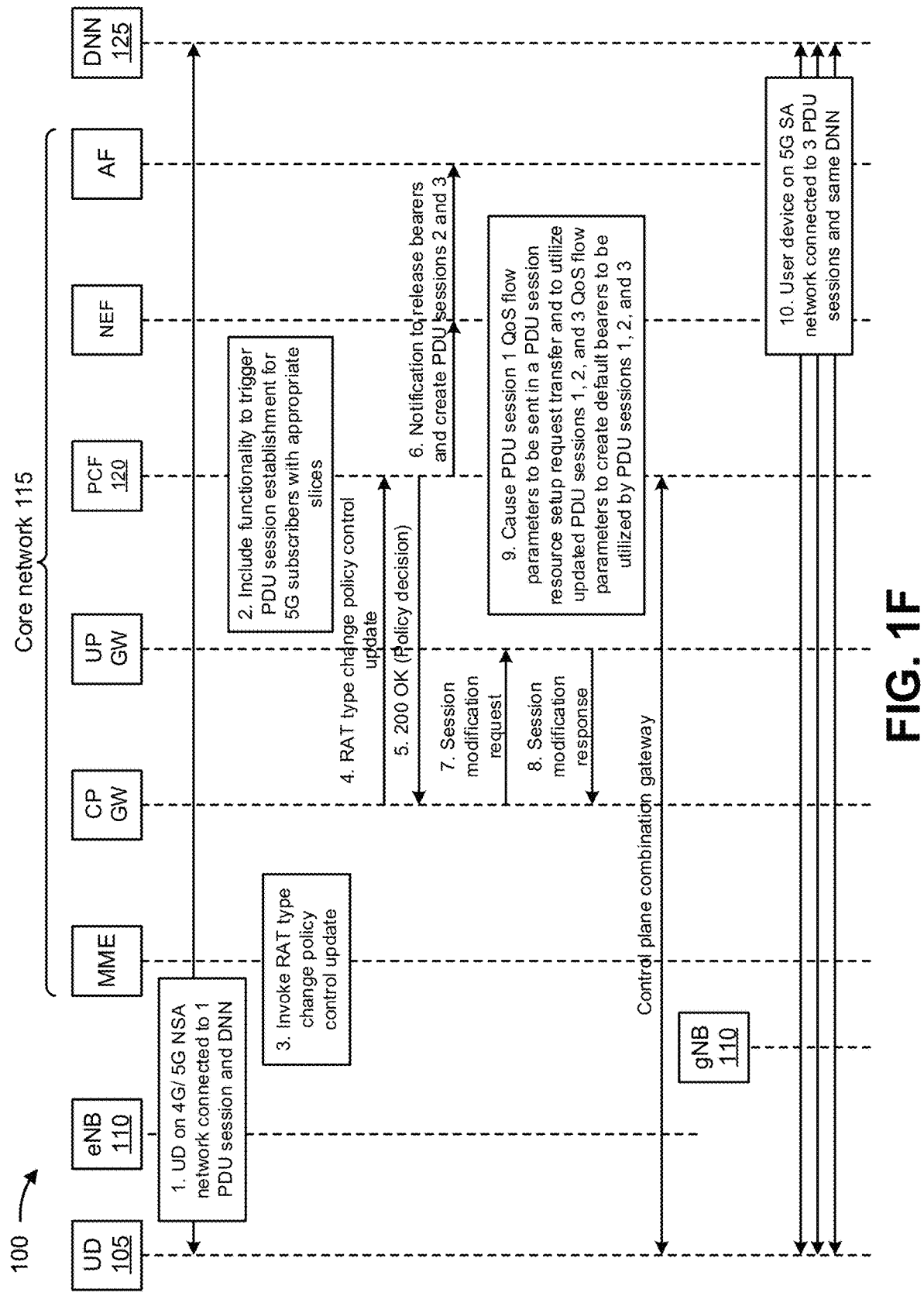

FIG. 1F is a call flow diagram depicting steps associated with handling the remaining PDU sessions according to a fourth handling option. As shown at step 1, the user device 105 may be on the 4G core network 115 or a 5G NSA network and connected to one PDU session with the same DNN configuration (e.g., the first network slice S-NSSAI 1, the second network slice S-NSSAI 2, and the third network slice S-NSSAI 3). As shown at step 2, the PCF 120 may include functionality that enables the PCF 120 to trigger PDU session establishment for 5G subscribers with appropriate slices. As shown at step 3, when the user device 105 begins moving from the 4G core network 115 to the 5G core network 115, mobility management entity device (MME) of the 4G core network 115 may generate a RAT type change policy control update (e.g., indicating that the user device 105 is moving from the 4G core network 115 to the 5G core network 115). As shown at step 4, the MME may provide the RAT type change policy control update to the PCF 120 so that the PCF 120 is aware that the user device 105 is moving from the 4G core network 115 to the 5G core network 115. As shown at step 5, the PCF 120 may acknowledge receipt of the RAT type change policy control update to the MME via an acknowledgment message (e.g., a 200 OK policy decision message).

As shown at step 6 in FIG. 1F, the PCF 120 may provide, to the AF and via the NEF of the 5G core network 115, a notification instructing the AF to release the second and third PDU sessions (e.g., the second network slice S-NSSAI 2 and the third network slice S-NSSAI 3). As shown at step 7, a control plane gateway (CP GW) of the 4G core network 115 may provide a session modification request (e.g., indicating that the second and third PDU sessions are to be released) to a user plane gateway (UP GW) of the 4G core network 115. As shown at step 8, the UP GW may release the second and third PDU sessions based on the session modification request, and may provide, to the CP GW, a session modification response indicating that the second and third PDU sessions have been released. In some implementations, the PCF 120 may not provide, to the AF and via the NEF, the notification instructing the AF to release the second and third PDU sessions, and the second and third PDU sessions may not be released. The PCF 120 may maintain a policy indicating whether the second and third PDU sessions are to be released.

As shown at step 9 in FIG. 1F, the PCF 120 may cause QoS flow parameters of the first PDU session to be sent to the user device 105 via a control plane combination gateway and a PDU session resource setup request transfer. The PCF 120 may also utilize updated QoS flow parameters for the first through third PDU sessions to create default bearers to be utilized by the first through third PDU sessions. The PCF 120 may cause three slices to be created in the 5G core network. For example, the PCF 120 may cause the first network slice (e.g., S-NSSAI 1), the second network slice (e.g., S-NSSAI 2), and the third network slice (e.g., S-NSSAI 3) to be created in the 5G core network. As shown at step 10, the user device 105 may utilize a 5G RAN 110 (e.g., a gNodeB) to connect to the 5G core network 115 (e.g., a 5G SA network) and utilize the first through third PDU sessions with the DNN device 125.

Figure 1G:
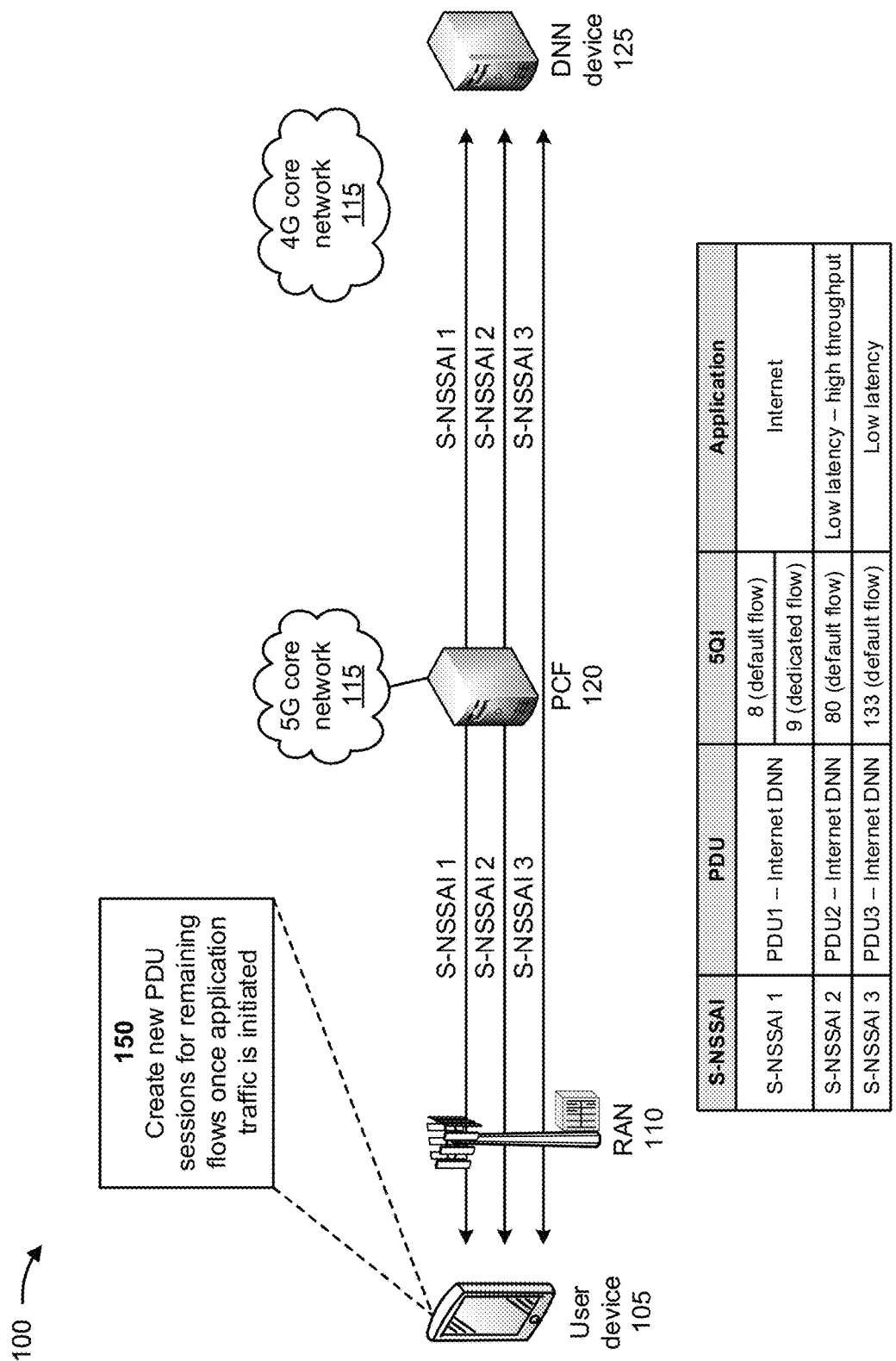

FIG. 1G is a diagram depicting steps associated with handling the remaining PDU sessions according to a fifth handling option, when the user device 105 is moving from the 4G core network 115 to the 5G core network 115. In the fifth handling option, the PCF 120 may release the second and third PDU sessions (e.g., the second network slice S-NSSAI 2 and the third network slice S-NSSAI 3). As further shown in FIG. 1G, and by reference number 150, the user device 105 may create new PDU sessions (e.g., new slices) for the second and third PDU sessions once application traffic is initiated by the user device 105 for the second and third PDU sessions.

In this way, the PCF 120 transfers multiple PDU sessions with a same DNN configuration between 4G and 5G networks. For example, when the user device 105, associated with multiple PDU sessions, moves from a 5G network to a 4G network, the PCF 120 may maintain one of the PDU sessions (e.g., a PDU session associated with a default flow) and may treat the remaining PDU sessions according to an option associated with releasing the remaining PDU sessions. When the user device 105 moves from the 4G network to the 5G network, the PCF 120 may maintain one of the PDU sessions (e.g., a PDU session associated with a default bearer) and may create slices for the remaining PDU sessions. Thus, the PCF 120 may conserve computing resources, networking resources, and/or other resources associated with failing to transfer multiple PDU sessions with a same DNN configuration between a 5G SA network and a 4G network, maintaining a correct PDU session during the transfer of the multiple PDU sessions, handling released PDU sessions during the transfer of the multiple PDU sessions, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
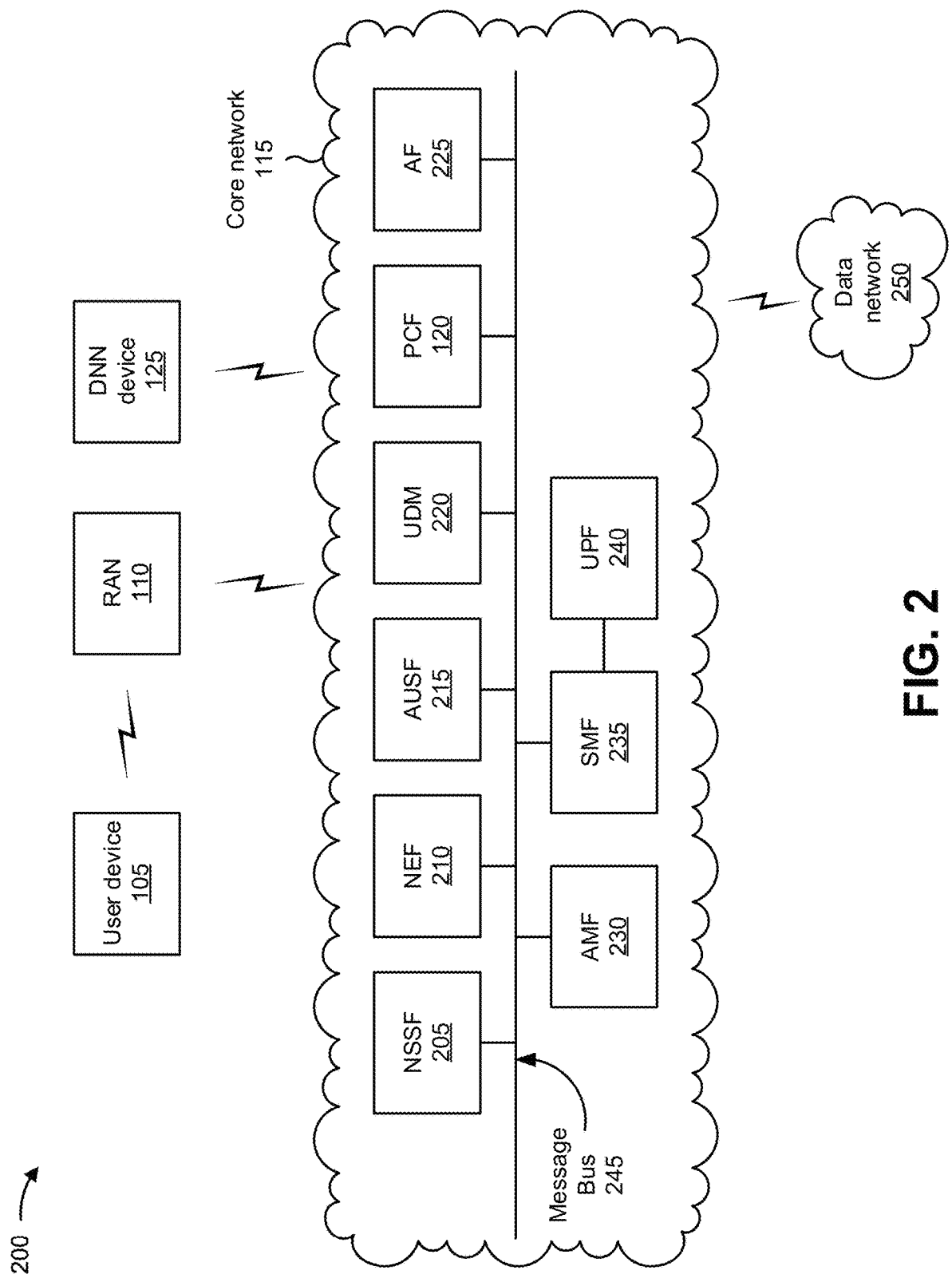
FIGS. 2 and 3 are diagrams of example environments in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, the DNN device 125, and a data network 250. Devices and/or networks of the example environment 200 may interconnect via wired connections, wireless connections, or a combination of wired and wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

The DNN device 125 includes one or more devices capable of receiving, generating, storing, processing, providing, and/or routing information, as described elsewhere herein. The DNN device 125 may include a communication device and/or a computing device. For example, the DNN device 125 may include a server, such as an application server, a client server, a web server, a database server, a host server, a proxy server, a virtual server (e.g., executing on computing hardware), or a server in a cloud computing system. In some implementations, the DNN device 125 includes computing hardware used in a cloud computing environment.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, the PCF 120, an application function (AF) 225, an access and mobility management function (AMF) 230, a session management function (SMF) 235, and/or a user plane function (UPF) 240. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the user device 105 in the wireless telecommunications system.

The UDM 220 includes one or more devices that store user data and profiles in the wireless telecommunications system. The UDM 220 may be used for fixed access and/or mobile access in the core network 115.

The PCF 120 includes one or more devices that provide a policy framework that incorporates network slicing, roaming, packet processing, and/or mobility management, among other examples.

The AF 225 includes one or more devices that support application influence on traffic routing, access to the NEF 210, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment IP address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an IMS, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
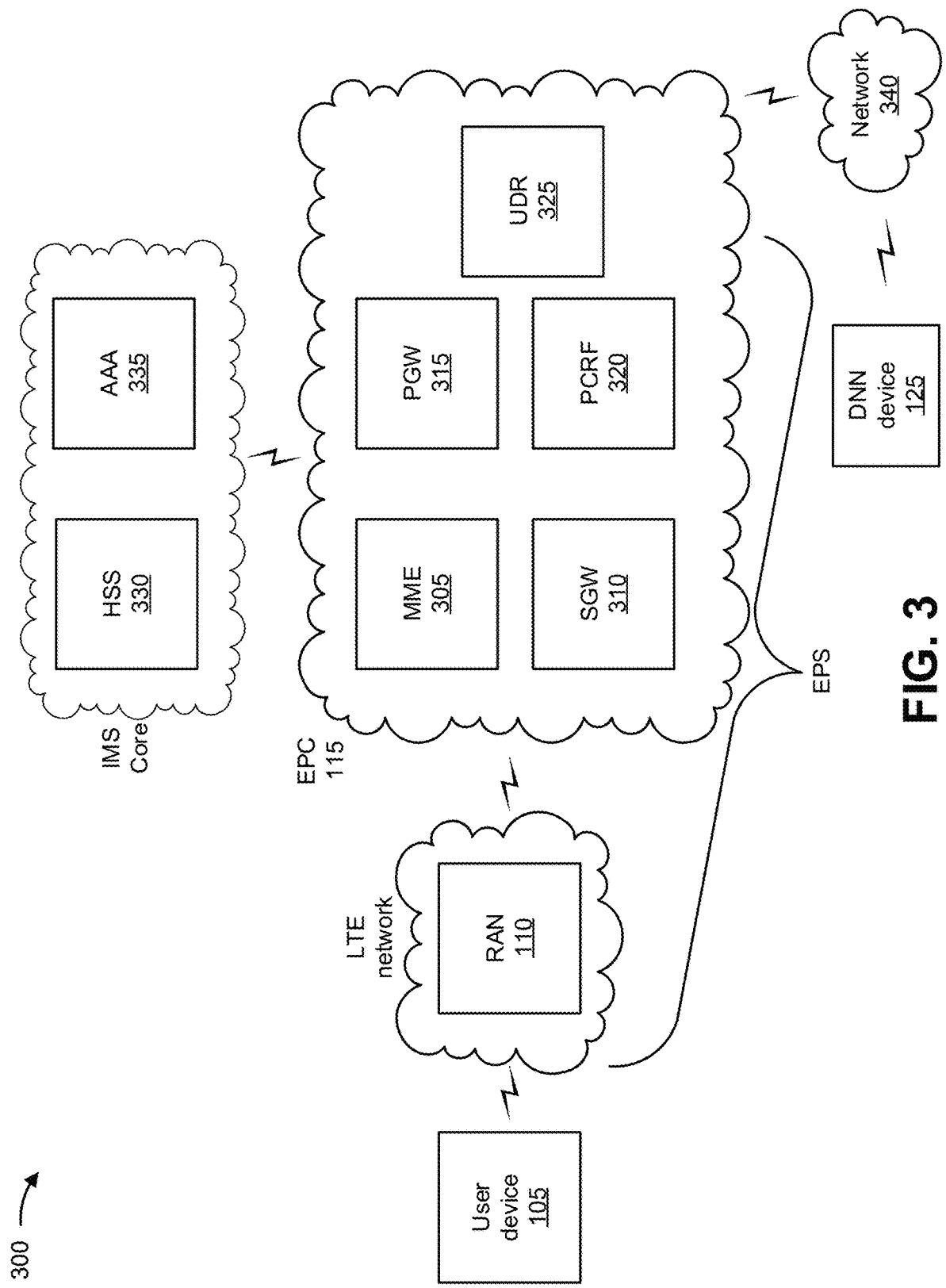

FIG. 3 is a diagram of an example environment 300 in which systems and/or methods, described herein, may be implemented. As shown in FIG. 3, the environment 300 may include the user device 105, the RAN 110, the DNN device 125, a mobility management entity device (MME) 305, a serving gateway (SGW) 310, a packet data network gateway (PGW) 315, a policy and charging rules function (PCRF) 320, a uniform data repository (UDR) 325, a home subscriber server (HSS) 330, an authentication, authorization, and accounting server (AAA) 335, and a network 340. Devices of the environment 300 may interconnect via wired connections, wireless connections, or a combination of wired and wireless connections.

Some implementations are described herein as being performed within a long-term evolution (LTE) network for explanatory purposes. Some implementations may be performed within a network that is not an LTE network, such as a third generation (3G) network or a 5G network.

The environment 300 may include an evolved packet system (EPS) that includes an LTE network and/or an evolved packet core (EPC) (e.g., the core network 115) that operate based on a third-generation partnership project (3GPP) wireless communication standard. The LTE network may include a RAN that includes one or more RANs 110 that take the form of evolved Node Bs (eNBs) via which the user device 105 communicates with the EPC 115. The EPC 115 may include the MME 305, the SGW 310, the PGW 315, the PCRF 320, and/or the UDR 325 to enable the user device 105 to communicate with the network 340 and/or an Internet protocol (IP) multimedia subsystem (IMS) core. The IMS core may include the HSS 330 and/or the AAA 335, and may manage device registration and authentication, session initiation, and/or other operations associated with user devices 105. The HSS 330 and/or the AAA 335 may reside in the EPC 115 and/or the IMS core.

The MME 305 includes one or more devices, such as one or more server devices, capable of managing authentication, activation, deactivation, and/or mobility functions associated with the user device 105. In some implementations, the MME 305 may perform operations relating to authentication of the user device 105. Additionally, or alternatively, the MME 305 may facilitate the selection of a particular SGW 310 and/or a particular PGW 315 to provide traffic to and/or from the user device 105. The MME 305 may perform operations associated with handing off the user device 105 from a first RAN 110 to a second RAN 110 when the user device 105 is transitioning from a first cell associated with the first RAN 110 to a second cell associated with the second RAN 110. Additionally, or alternatively, the MME 305 may select another MME (not pictured), to which the user device 105 should be handed off (e.g., when the user device 105 moves out of range of the MME 305).

The SGW 310 includes one or more devices capable of routing packets. For example, the SGW 310 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, the SGW 310 may aggregate traffic received from one or more RANs 110 associated with the LTE network, and may send the aggregated traffic to the network 340 (e.g., via the PGW 315) and/or other network devices associated with the EPC 115 and/or the IMS core. The SGW 310 may receive traffic from the network 340 and/or other network devices, and may send the received traffic to the user device 105 via the RAN 110. Additionally, or alternatively, the SGW 310 may perform operations associated with handing off the user device 105 to and/or from an LTE network.

The PGW 315 includes one or more devices capable of providing connectivity for the user device 105 to external packet data networks (e.g., other than the depicted EPC 115 and/or the LTE network). For example, the PGW 315 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, the PGW 315 may aggregate traffic received from one or more SGWs 310, and may send the aggregated traffic to the network 340. Additionally, or alternatively, the PGW 315 may receive traffic from the network 340, and may send the traffic to the user device 105 via the SGW 310 and the RAN 110. The PGW 315 may record data usage information (e.g., byte usage), and may provide the data usage information to the AAA 335.

The PCRF 320 includes one or more devices, such as one or more server devices, capable of providing policy control decision and flow-based charging control functionalities. For example, the PCRF 320 may provide network control regarding service data flow detection, gating, and/or quality of service (QoS) and flow-based charging, among other examples. In some implementations, the PCRF 320 may determine how a certain service data flow is to be treated, and may ensure that user plane traffic mapping and treatment is in accordance with a user subscription profile.

The UDR 325 includes one or more devices, such as one or more server devices, data structures, and/or the like. For example, the UDR 325 may provide a converged repository of subscriber information that can be used to service a number of network functions.

The HSS 330 includes one or more devices, such as one or more server devices, capable of managing (e.g., receiving, generating, storing, processing, and/or providing) information associated with the user device 105. For example, the HSS 330 may manage subscription information associated with the user device 105, such as information that identifies a subscriber profile of a user associated with the user device 105, information that identifies services and/or applications that are accessible to the user device 105, location information associated with the user device 105, a network identifier (e.g., a network address) that identifies the user device 105, information that identifies a treatment of the user device 105 (e.g., quality of service information, a quantity of minutes allowed per time period, a quantity of data consumption allowed per time period, etc.), and/or similar information. The HSS 330 may provide this information to one or more other devices of the environment 300 to support the operations performed by those devices.

The AAA 335 includes one or more devices, such as one or more server devices, that perform authentication, authorization, and/or accounting operations for communication sessions associated with the user device 105. For example, the AAA 335 may perform authentication operations for the user device 105 and/or a user of the user device 105 (e.g., using one or more credentials), may control access, by the user device 105, to a service and/or an application (e.g., based on one or more restrictions, such as time-of-day restrictions, location restrictions, single or multiple access restrictions, read/write restrictions, etc.), may track resources consumed by the user device 105 (e.g., a quantity of voice minutes consumed, a quantity of data consumed, etc.), and/or may perform similar operations.

The network 340 includes one or more wired and/or wireless networks. For example, the network 340 may include a cellular network (e.g., a 5G network, an LTE network, a 3G network, a code division multiple access (CDMA) network, etc.), a PLMN, a LAN, a WAN, a MAN, a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
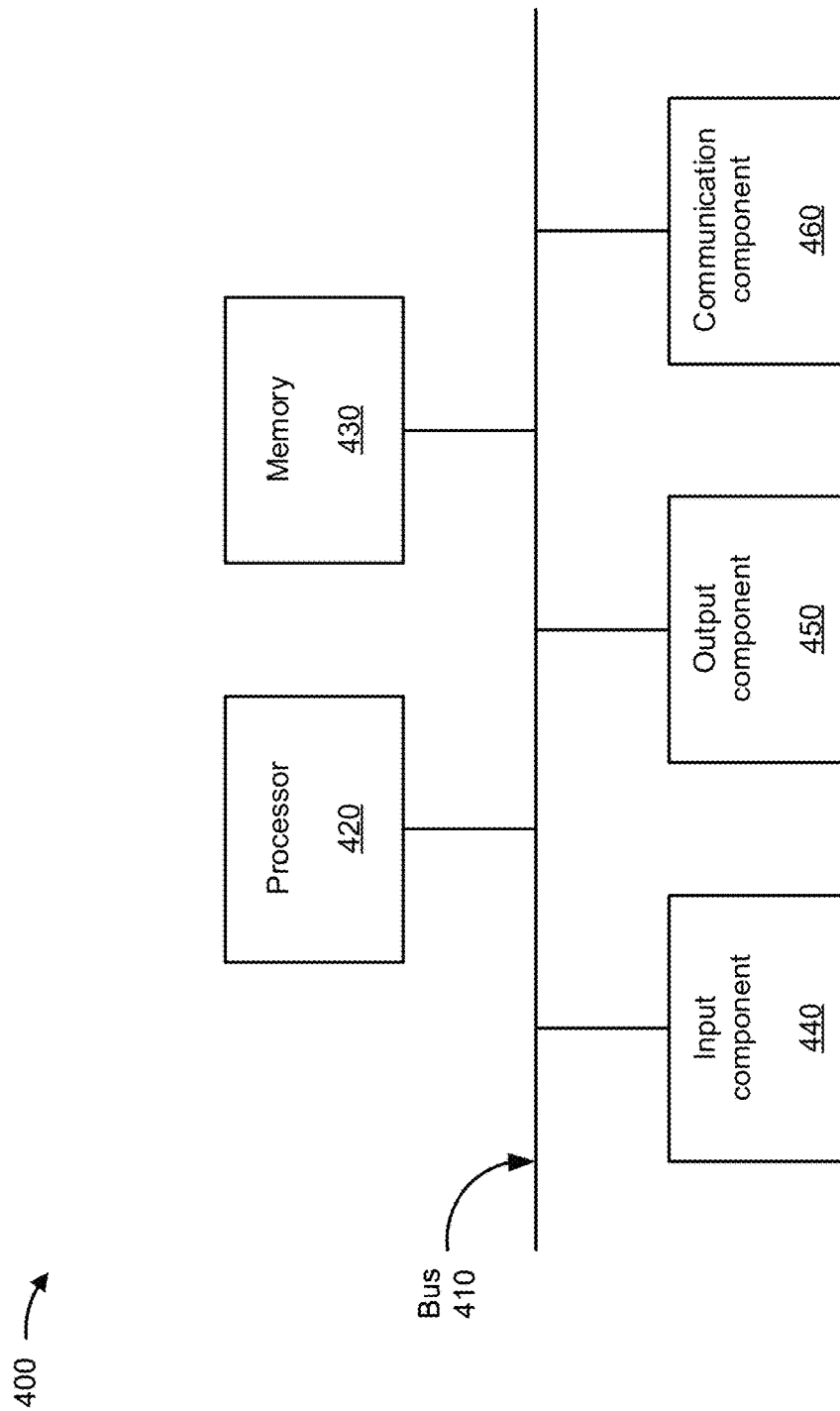
FIG. 4 is a diagram of example components of one or more devices of FIGS. 2 and 3.

FIG. 4 is a diagram of example components of a device 400, which may correspond to the user device 105, the RAN 110, the PCF 120, the DNN device 125, the NSSF 205, the NEF 210, the AUSF 215, the UDM 220, the AF 225, the AMF 230, the SMF 235, the UPF 240, the MME 305, the SGW 310, the PGW 315, the PCRF 320, the UDR 325, the HSS 330, and/or the AAA 335. In some implementations, the user device 105, the RAN 110, the PCF 120, the DNN device 125, the NSSF 205, the NEF 210, the AUSF 215, the UDM 220, the AF 225, the AMF 230, the SMF 235, the UPF 240, the MME 305, the SGW 310, the PGW 315, the PCRF 320, the UDR 325, the HSS 330, and/or the AAA 335 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
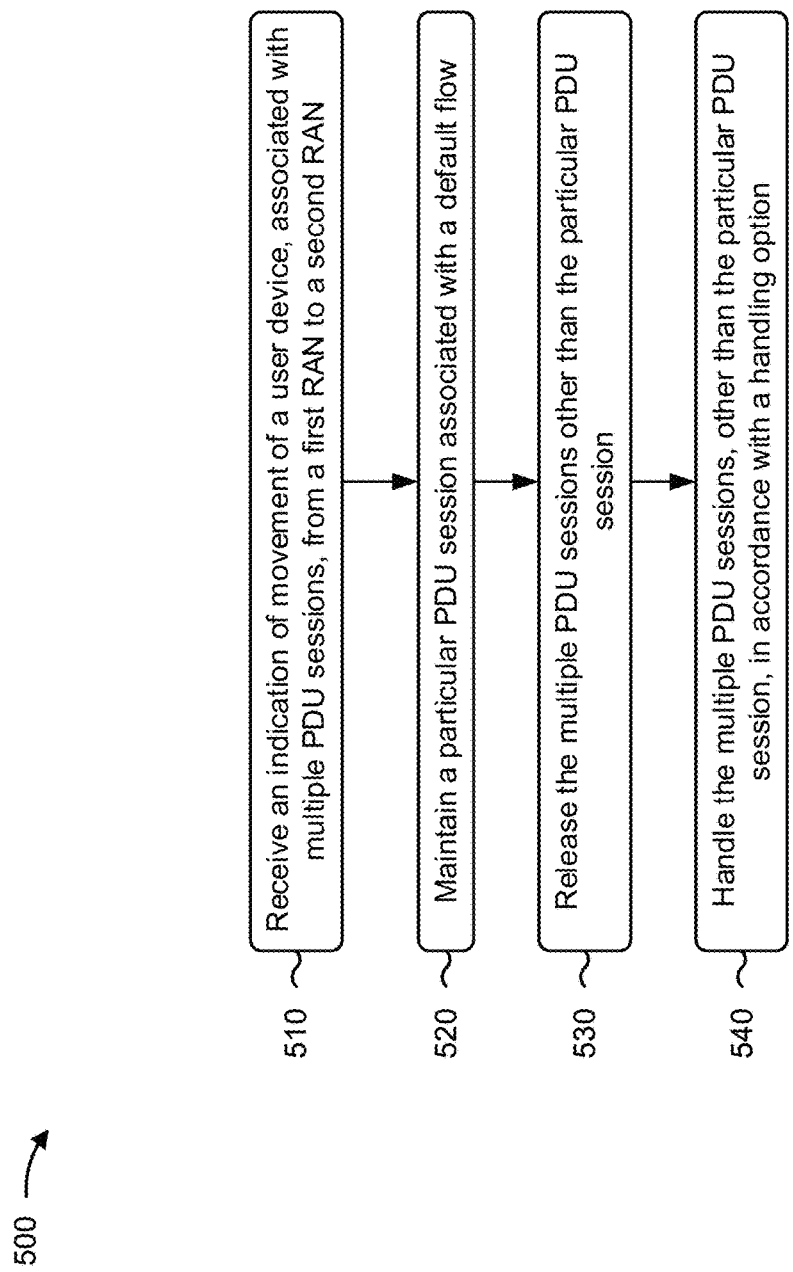
FIG. 5 is a flowchart of an example process for transferring multiple PDU sessions with a same DNN configuration between networks.

FIG. 5 is a flowchart of an example process 500 for transferring multiple PDU sessions with a same DNN configuration between 4G and 5G networks. In some implementations, one or more process blocks of FIG. 5 may be performed by a network device (e.g., the PCF 120). In some implementations, one or more process blocks of FIG. 5 may be performed by another device or a group of devices separate from or including the network device, such as a RAN (e.g., the RAN 110), an AMF (e.g., the AMF 230), an SMF (e.g., the SMF 235), a UPF (e.g., the UPF 240), an NEF (e.g., the NEF 210), and/or an AF (e.g., the AF 225). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving an indication of movement of a user device, associated with multiple PDU sessions, from a first RAN to a second RAN (block 510). For example, the network device may receive an indication of movement of a user device, associated with multiple PDU sessions, from a first RAN to a second RAN, as described above. In some implementations, the first RAN corresponds to a fifth generation standalone access RAN and the second RAN corresponds to a fourth generation RAN or a fifth generation non-standalone access RAN. In some implementations, the first RAN corresponds to a fourth generation RAN or a fifth generation non-standalone access RAN and the second RAN corresponds to a fifth generation standalone access RAN.

In some implementations, the multiple PDU sessions are associated with a same data network name configuration. In some implementations, the multiple PDU sessions are associated with one or more of an Internet only default flow, an Internet only dedicated flow, an Internet, low latency, and high throughput default flow, or an Internet, low latency, and high throughput dedicated flow.

As further shown in FIG. 5, process 500 may include maintaining, based on the indication, a particular PDU session, of the multiple PDU sessions, associated with a default flow (block 520). For example, the network device may maintain, based on the indication, a particular PDU session, of the multiple PDU sessions, associated with a default flow, as described above. In some implementations, maintaining the particular PDU session, of the multiple PDU sessions, associated with the default flow includes causing the user device to connect to the particular PDU session via the second RAN.

As further shown in FIG. 5, process 500 may include releasing, based on the indication, the multiple PDU sessions other than the particular PDU session (block 530). For example, the network device may release, based on the indication, the multiple PDU sessions other than the particular PDU session, as described above.

As further shown in FIG. 5, process 500 may include handling the multiple PDU sessions, other than the particular PDU session, in accordance with a handling option (block 540). For example, the network device may handle the multiple PDU sessions, other than the particular PDU session, in accordance with a handling option, as described above. In some implementations, handling the multiple PDU sessions, other than the particular PDU session, in accordance with the handling option includes creating a service interruption for applications associated with the multiple PDU sessions, other than the particular PDU session.

In some implementations, handling the multiple PDU sessions, other than the particular PDU session, in accordance with the handling option includes causing dedicated bearers to be created to serve the multiple PDU sessions, other than the particular PDU session, and causing the multiple PDU sessions, other than the particular PDU session, to utilize the dedicated bearers via the second RAN. In some implementations, handling the multiple PDU sessions, other than the particular PDU session, in accordance with the handling option includes causing a default bearer, associated with the default flow, to serve the multiple PDU sessions, other than the particular PDU session, and causing the multiple PDU sessions, other than the particular PDU session, to utilize the default bearer via the second RAN.

In some implementations, handling the multiple PDU sessions, other than the particular PDU session, in accordance with the handling option includes generating new PDU sessions for the multiple PDU sessions, other than the particular PDU session, and causing the new PDU sessions to utilize the second RAN. In some implementations, handling the multiple PDU sessions, other than the particular PDU session, in accordance with the handling option includes receiving, from the user device, new PDU sessions for the multiple PDU sessions, other than the particular PDU session, and utilizing the new PDU sessions via the second RAN.

In some implementations, process 500 includes causing the user device to perform an interworking handover from the first RAN to the second RAN.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a network device, an indication of movement of a user device, associated with multiple packet data unit (PDU) sessions, from a first radio access network (RAN) to a second RAN;
maintaining, by the network device and based on the indication, a particular PDU session, of the multiple PDU sessions, associated with a default flow;
releasing, by the network device and based on the indication, the multiple PDU sessions other than the particular PDU session; and
handling, by the network device, the multiple PDU sessions, other than the particular PDU session, in accordance with a handling option.

2. The method of claim 1, wherein the first RAN corresponds to a fifth generation standalone access RAN and the second RAN corresponds to a fourth generation RAN or a fifth generation non-standalone access RAN.

3. The method of claim 1, wherein the first RAN corresponds to a fourth generation RAN or a fifth generation non-standalone access RAN and the second RAN corresponds to a fifth generation standalone access RAN.

4. The method of claim 1, wherein the multiple PDU sessions are associated with a same data network name configuration.

5. The method of claim 1, wherein the multiple PDU sessions are associated with one or more of:
an Internet only default flow,
an Internet only dedicated flow,
an Internet, low latency, and high throughput default flow, or
an Internet, low latency, and high throughput dedicated flow.

6. The method of claim 1, wherein maintaining the particular PDU session, of the multiple PDU sessions, associated with the default flow comprises:
causing the user device to connect to the particular PDU session via the second RAN.

7. The method of claim 1, wherein handling the multiple PDU sessions, other than the particular PDU session, in accordance with the handling option comprises:
creating a service interruption for applications associated with the multiple PDU sessions, other than the particular PDU session.

8. A network device, comprising:
one or more processors configured to:
receive an indication of movement of a user device, associated with multiple packet data unit (PDU) sessions, from a first radio access network (RAN) to a second RAN,
wherein the multiple PDU sessions are associated with a same data network name configuration;
maintain, based on the indication, a particular PDU session, of the multiple PDU sessions, associated with a default flow;
release, based on the indication, the multiple PDU sessions other than the particular PDU session; and
handle the multiple PDU sessions, other than the particular PDU session, in accordance with a handling option.

9. The network device of claim 8, wherein the one or more processors, to handle the multiple PDU sessions, other than the particular PDU session, in accordance with the handling option, are configured to:
cause dedicated bearers to be created to serve the multiple PDU sessions, other than the particular PDU session; and
cause the multiple PDU sessions, other than the particular PDU session, to utilize the dedicated bearers via the second RAN.

10. The network device of claim 8, wherein the one or more processors, to handle the multiple PDU sessions, other than the particular PDU session, in accordance with the handling option, are configured to:
cause a default bearer, associated with the default flow, to serve the multiple PDU sessions, other than the particular PDU session; and
cause the multiple PDU sessions, other than the particular PDU session, to utilize the default bearer via the second RAN.

11. The network device of claim 8, wherein the one or more processors, to handle the multiple PDU sessions, other than the particular PDU session, in accordance with the handling option, are configured to:
generate new PDU sessions for the multiple PDU sessions, other than the particular PDU session; and
cause the new PDU sessions to utilize the second RAN.

12. The network device of claim 8, wherein the one or more processors, to handle the multiple PDU sessions, other than the particular PDU session, in accordance with the handling option, are configured to:
receive, from the user device, new PDU sessions for the multiple PDU sessions, other than the particular PDU session; and
utilize the new PDU sessions via the second RAN.

13. The network device of claim 8, wherein the one or more processors are further configured to:
cause the user device to perform an interworking handover from the first RAN to the second RAN.

14. The network device of claim 8, wherein the network device is a policy control function device.

15. A non-transitory computer-readable medium storing a set of instructions, the set of instructions comprising:
one or more instructions that, when executed by one or more processors of a network device, cause the network device to:
receive an indication of movement of a user device, associated with multiple packet data unit (PDU) sessions, from a first radio access network (RAN) to a second RAN;
maintain, based on the indication, a particular PDU session, of the multiple PDU sessions, associated with a default flow;
release, based on the indication, the multiple PDU sessions other than the particular PDU session;
cause the user device to perform an interworking handover from the first RAN to the second RAN; and
handle the multiple PDU sessions, other than the particular PDU session, in accordance with a handling option.

16. The non-transitory computer-readable medium of claim 15, wherein the multiple PDU sessions are associated with a same data network name configuration.

17. The non-transitory computer-readable medium of claim 15, wherein the one or more instructions, that cause the network device to handle the multiple PDU sessions, other than the particular PDU session, in accordance with the handling option, cause the network device to:
create a service interruption for applications associated with the multiple PDU sessions, other than the particular PDU session.

18. The non-transitory computer-readable medium of claim 15, wherein the one or more instructions, that cause the network device to handle the multiple PDU sessions, other than the particular PDU session, in accordance with the handling option, cause the network device to:
- cause dedicated bearers to be created to serve the multiple PDU sessions, other than the particular PDU session; and
- cause the multiple PDU sessions, other than the particular PDU session, to utilize the dedicated bearers via the second RAN.

19. The non-transitory computer-readable medium of claim 15, wherein the one or more instructions, that cause the network device to handle the multiple PDU sessions, other than the particular PDU session, in accordance with the handling option, cause the network device to:
- cause a default bearer, associated with the default flow, to serve the multiple PDU sessions, other than the particular PDU session; and
- cause the multiple PDU sessions, other than the particular PDU session, to utilize the default bearer via the second RAN.

20. The non-transitory computer-readable medium of claim 15, wherein the one or more instructions, that cause the network device to handle the multiple PDU sessions, other than the particular PDU session, in accordance with the handling option, cause the network device to:
- generate new PDU sessions for the multiple PDU sessions, other than the particular PDU session; and
- cause the new PDU sessions to utilize the second RAN.

* * * * *